US007999815B1

(12) United States Patent
Riach et al.

(10) Patent No.: US 7,999,815 B1
(45) Date of Patent: Aug. 16, 2011

(54) ACTIVE RASTER COMPOSITION AND ERROR CHECKING IN HARDWARE

(75) Inventors: Duncan A. Riach, Mountain View, CA (US); Leslie E. Neft, Mountain View, CA (US); Michael A. Ogrinc, San Francisco, CA (US); Tyvis C. Cheung, Santa Clara, CA (US)

(73) Assignee: NVDIA Corporation, Santa Clara, CA (US)

(*) Notice: Subject to any disclaimer, the term of this patent is extended or adjusted under 35 U.S.C. 154(b) by 944 days.

(21) Appl. No.: 11/936,035

(22) Filed: Nov. 6, 2007

(51) Int. Cl.
*G06F 13/14* (2006.01)
*G06F 13/00* (2006.01)
*G06T 1/00* (2006.01)
*G09G 5/39* (2006.01)

(52) U.S. Cl. ......... 345/522; 345/520; 345/531; 345/537

(58) Field of Classification Search .................. 345/537, 345/539, 545, 548, 502–505, 520, 522, 531
See application file for complete search history.

(56) References Cited

U.S. PATENT DOCUMENTS

2004/0101056 A1 5/2004 Wong et al.
2006/0132491 A1* 6/2006 Riach et al. .................. 345/505

OTHER PUBLICATIONS

Office Action, U.S. Appl. No. 11/936,038, dated Nov. 8, 2010.

* cited by examiner

*Primary Examiner* — Hau H Nguyen
(74) *Attorney, Agent, or Firm* — Patterson & Sheridan, LLP

(57) ABSTRACT

One embodiment of the present invention sets forth a system for computing and error checking configuration parameters related to raster image generation within a graphics processing unit. Input parameters are validated by a hardware-based error checking engine. A hardware-based pre-calculation engine uses validated input parameters to compute additional private configuration parameters used by the raster image generation circuitry within a graphics processing unit.

22 Claims, 7 Drawing Sheets

ACTIVE RASTER COMPOSITION AND ERROR CHECKING IN HARDWARE

BACKGROUND OF THE INVENTION

1. Field of the Invention

Embodiments of the present invention relate generally to graphics system architecture and more specifically to active raster composition and error checking in hardware.

2. Description of the Related Art

Typical computer systems include, with out limitation, a central processing unit (CPU), a graphics processing unit (GPU), at least one display device, and input devices, such as a keyboard and mouse. The display device generates a raster image for display from a sequential pixel stream generated by the GPU. The pixel stream may be represented in analog or digital form for transmission. Timing information embedded in the pixel steam enables the display device to synchronize the display output rasterization with the arrival time of input pixels. The timing information may include a vertical synchronization marker, used to indicate the start time of a complete raster image, and a horizontal synchronization marker, used to indicate the start time of a horizontal line within the raster image.

A span of blank time is typically inserted before and after a synchronization marker. For example, pixels on a horizontal line are blank (black) before and after a horizontal synchronization marker, and a number of completely blank lines are transmitted before and after a vertical synchronization marker. Cathode ray tube (CRT) display devices use this blank time for beam retrace, thereby avoiding retrace artifacts that diminish image quality on the display. Display devices that implement direct pixel access technology, such as liquid crystal display (LCD) and plasma display technologies, do not have the same blanking requirement because there is no need for retrace time. As a result, display devices built using direct pixel access technologies are beginning to reduce the amount of tolerated blanking time within an incoming pixel stream in order to reallocate the time to other purposes, such as increasing the bandwidth available for displayed pixels. Display devices that need no vertical blank lines are technically possible, using direct pixel access technologies, and offer optimal bandwidth for displayed pixels.

The raster image transmitted to the display device is customarily generated using a composite of multiple source images. For example, the raster image may include a background image and a cursor image. The raster image may also include one or more overlay images, such as a real-time video image. In order to composite and generate a raster image that is formed properly according to available system resources and user input, the GPU requires a number of configuration parameters to be set. The configuration parameters generally correspond to hardware registers used by the GPU to composite, process, and generate the raster image in real-time. The configuration parameters associated with raster image generation may represent a large amount of data and span multiple functional modules within the GPU.

When the user moves the mouse and changes the position of the cursor within the raster image, certain configuration parameters need to be updated to reflect the new position of the cursor in the raster composition process. When the user changes the size or position of a video playback window, the configuration parameters associated with the corresponding overlay need to be updated to reflect the new overlay configuration in the raster composition process. The computation of new parameters is performed by the GPU driver in response to user input and system resource availability. Each time any configuration parameters need to be changed, an interrupt is generated to the GPU driver executing within the CPU. The GPU driver then computes a new set of configuration parameters for transmission to the GPU. The new configuration parameters typically take effect after a new vertical synchronization mark is generated, allowing the CPU at least the vertical blank time to compute and transmit the new parameters.

As display technology advances and the amount of vertical blank time available to the CPU for computing new configuration parameters is diminished, a larger portion of overall CPU power needs to be consumed to computing new configuration parameters. The result is diminished overall system performance and, potentially, transient display artifacts that result from the CPU falling behind in performing GPU driver computations.

As the foregoing illustrates, what is needed in the art is a system that improves the performance of configuration parameter computation for raster composition.

SUMMARY OF THE INVENTION

One embodiment of the present invention sets forth a method for computing configuration parameters within a graphics processing unit. The method includes the steps of receiving commands from a command queue, determining whether a first command is an update command, if the first command is not an update command, storing a configuration parameter associated with the first command in a state cache, and transmitting the configuration parameter over a bundle bus to a module, and if the first command is an update command, performing a pre-calculation procedure to generate a private configuration parameter, and transmitting the private configuration parameter over the bundle bus to the module.

One advantage of the disclosed method is that it may be implemented in hardware, within a graphics processing unit, to provide a high-performance hardware-based error checking and computation of configuration parameters for raster composition within the graphics processing unit.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
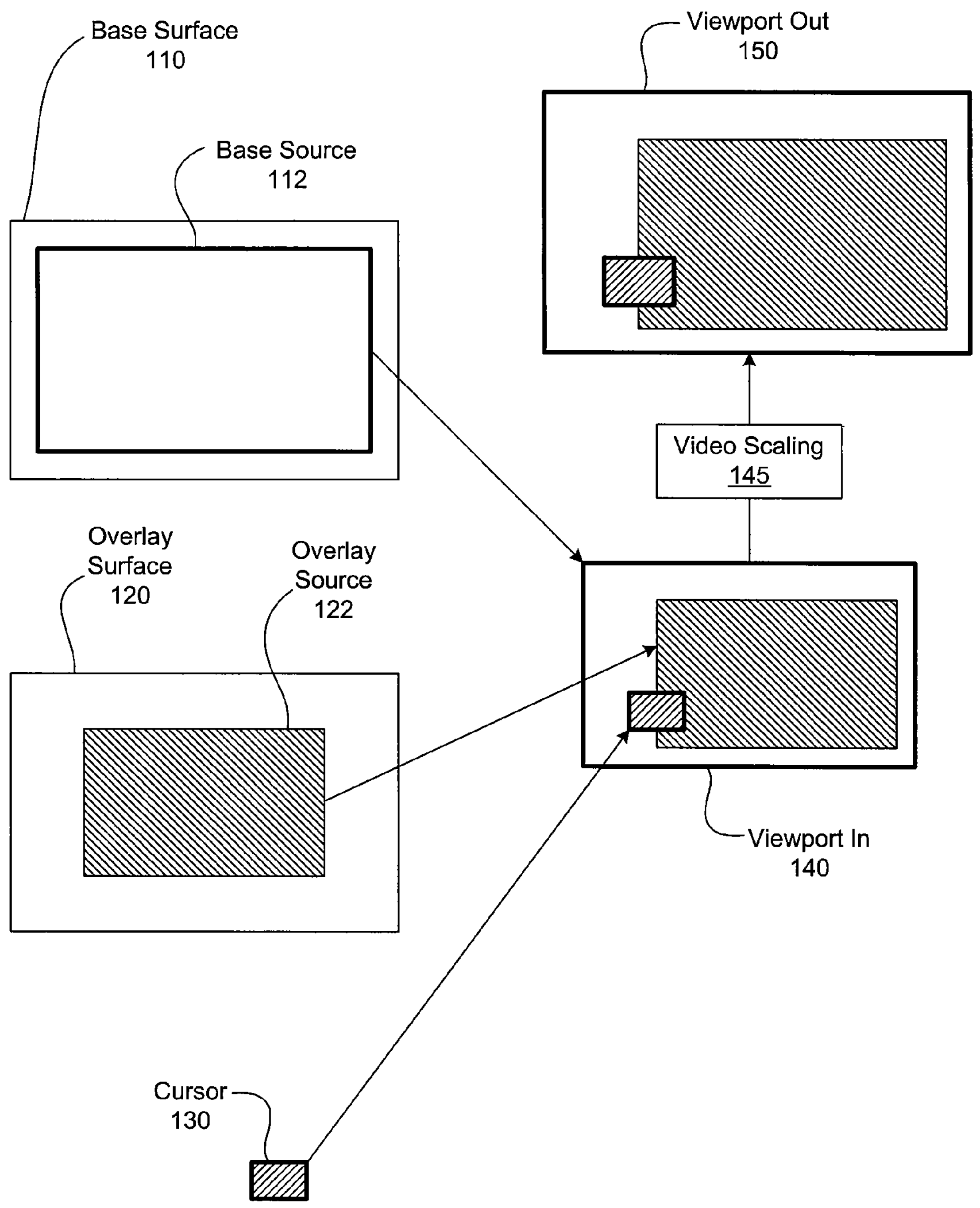
FIG. 1A illustrates the process of generating a viewport out image, according to one embodiment of the invention.

FIG. 1A illustrates the process of generating a viewport out surface 150, according to one embodiment of the invention. A base surface 110 includes a base source 112, which may be defined to include any sub-region of the base surface 110, including the entire base surface 110. An overlay surface 120 includes an overlay source 122, which may be defined to include any sub-region of the overlay surface 120, including the entire overlay source 122. A cursor 130 is typically a surface that includes a image used to indicate a location on a display device (not shown).

The base source 112, the overlay source 122, and the cursor 130 are combined together to form an image that is generated in a viewport in surface 140. The viewport in surface 140 is processed by a video scaling unit 145 to generate a viewport out surface 150. The viewport out surface 150 should be suitable for display in the native resolution of a display device.

Figure 1B:
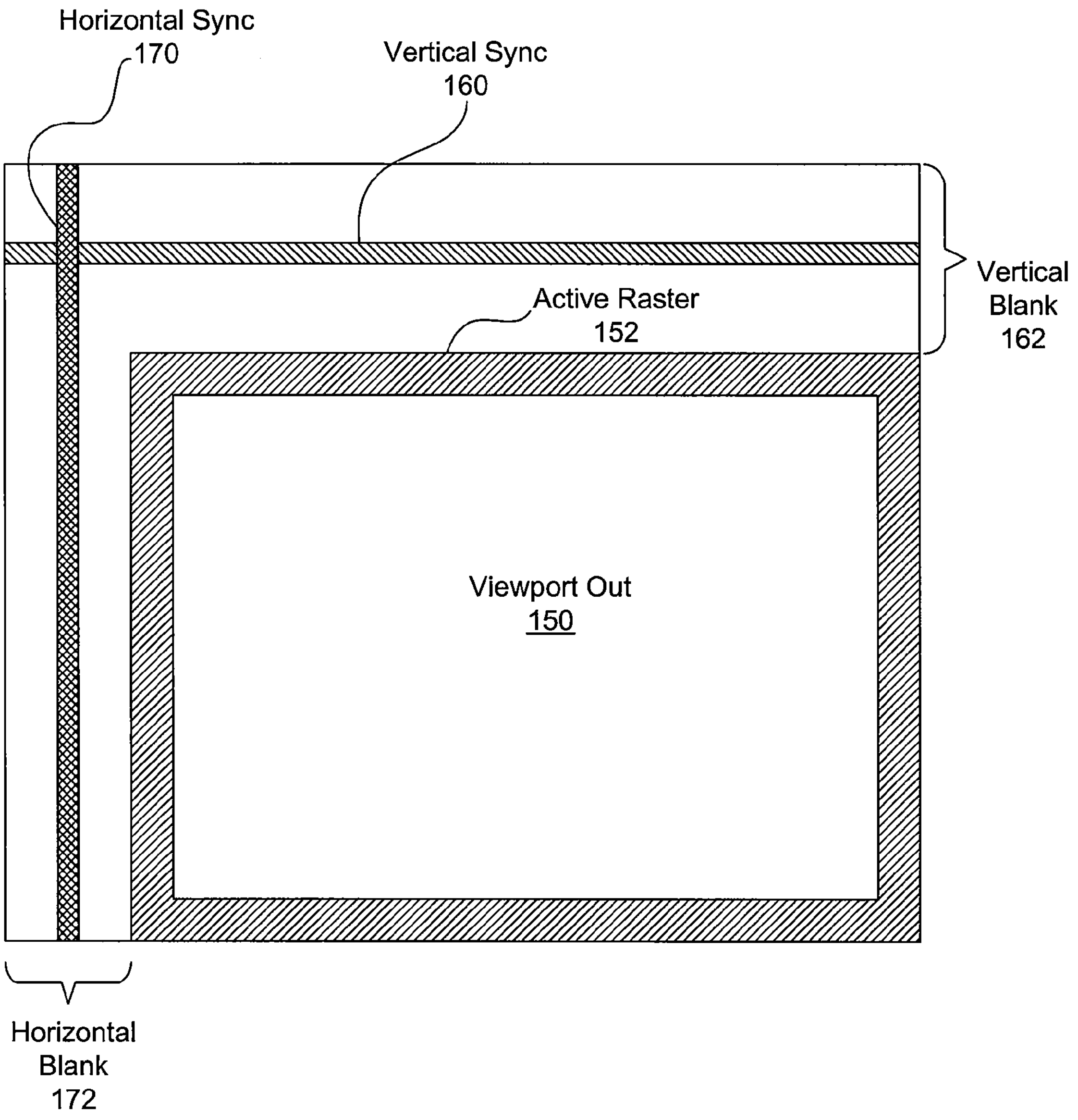
FIG. 1B illustrates the elements composited to form a raster image, according to one embodiment of the invention.

FIG. 1B illustrates the elements composited to form a raster image, according to one embodiment of the invention. An active raster region 152 represents the region on a display device (not shown) that may display information. The viewport out surface 150 from FIG. 1A maps to the active raster region 152. The mapping may be one-to-one, whereby the viewport out surface 150 matches the active raster region 152, or the viewport out surface 150 may be inset within the active raster region 152.

Any blank vertical lines above or below the active raster region 152 may be modeled as a vertical blank region 162. A vertical sync 160 indicates the timing of the vertical trace in a raster image displayed within the viewport out surface 150. Any horizontal blank time along a horizontal raster line may be represented as a horizontal blank region 172. A horizontal sync 170 indicates the timing of the horizontal trace in the raster image displayed within the viewport out surface 150.

The capabilities of a given computer system, GPU and display device combine to enable certain possible configurations to be used for displaying data. These configurations are programmed into the GPU via a GPU driver, with potential input from a user. Additionally, the user may alter, without limitation, the size and location of the overlay surface 120 or the position of the cursor 130 within the viewport in surface 140. The user may alter the resolution or pixel depth of the viewport out surface 150 or other parameters that define the properties related to displaying an image within the active raster region 152. As discussed in FIGS. 2 through 5 below, the GPU-specific parameters for controlling raster image generation may be computed by hardware within the GPU, rather than using prior art approaches that involve extensive use of device driver interrupts.

Figure 2:
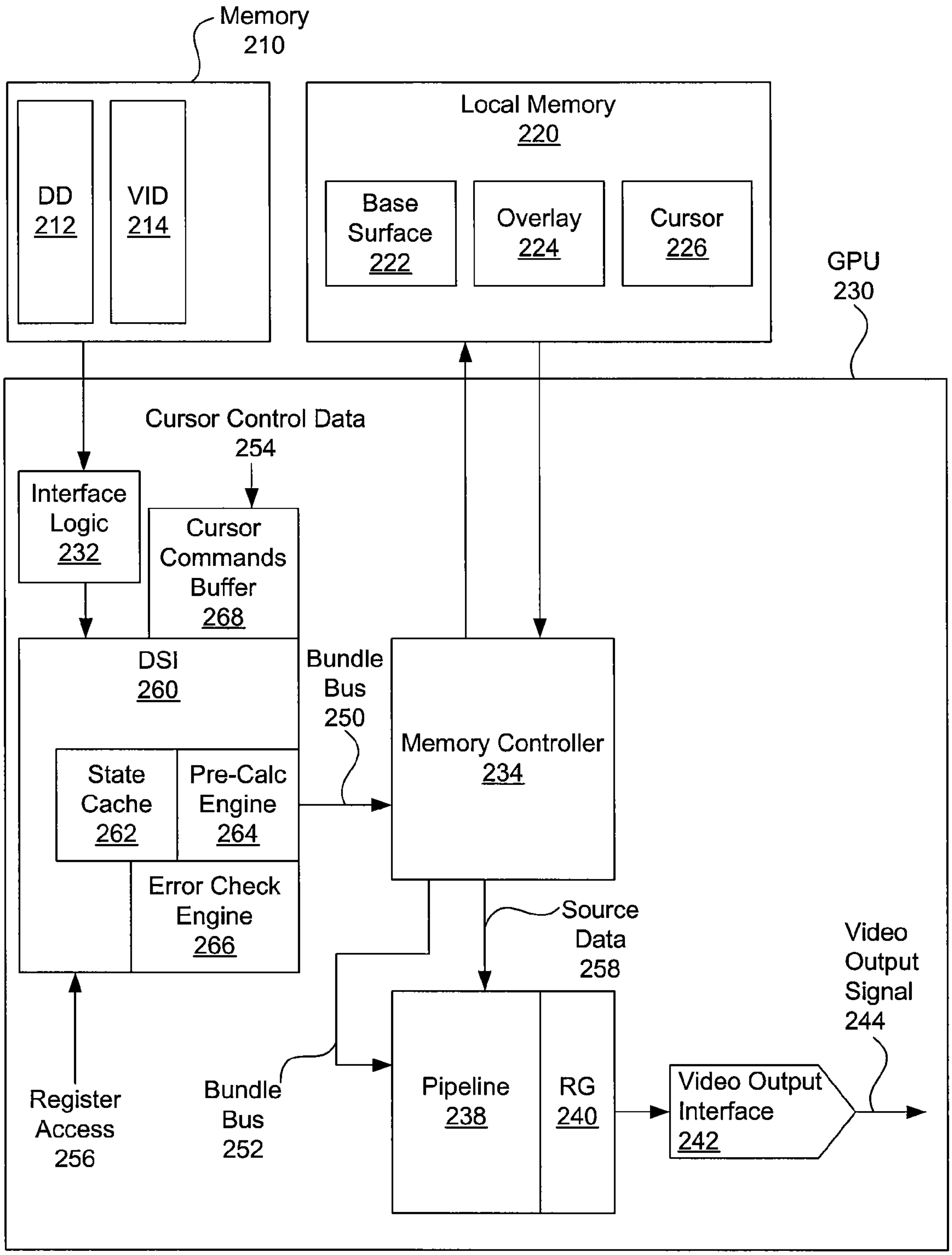
FIG. 2 illustrates a GPU configured to compute and error check configuration parameters, according to one embodiment of the invention.

FIG. 2 illustrates a GPU 230 configured to compute and error check configuration parameters, according to one embodiment of the invention. A local memory 220 and a memory 210, such as a shared system memory, are attached to the GPU 230. The local memory 220 includes, without limitation, a base surface 222, an overlay 224, and a cursor 226. The memory 210 includes, without limitation, buffers for a display driver (DD) queue 212 and a video driver (VID) queue 214. The DD 212 and VID 214 may store commands used to control video raster generation within the GPU 230. In one embodiment, the memory 210 is part of a system memory that is associated with a host system (not shown). In a second embodiment, the memory 210 is incorporated within a local memory, such as local memory 220, associated with the GPU 230. In a third embodiment, buffers DD 212 and VID 214 may be located in either local memory 220 or system memory on an individual bases.

The GPU 230 includes interface logic 232, a display software interface (DSI) 260, a cursor commands buffer 268, a memory controller 234, a pipe line 238, a raster generator (RG) unit 240, and a video output interface 242.

The interface logic 232 bridges access between the DSI 260 and the memory 210, enabling the DSI 260 to access the DD 212 and the VID 214. The cursor commands buffer 268 receives cursor control data 254, such as cursor position information, and queues the cursor control data 254 for processing within the DSI 260. The memory controller 234 bridges access between the pipe line 238 and local memory 220, enabling the pipeline 238 to access data stored in the base surface 222, overlay 224, and cursor 226. The data is transmitted to the pipe line 238 as source data 258. The pipe line 238 composites the source data 258 into final pixel values that are transmitted by the RG 240, along with timing information, to the video output interface 242. The video output interface 242 generates a video output signal 244 used to transmit a stream of pixel data and timing data to a display device (not shown). The video output interface 242 may include video digital-to-analog converters (DACs) that generate analog video output as the video output signal 244. Alternately, the video output interface 242 may include a serial digital video interface that generates a high-speed serial digital video signal as the video output signal 244.

The DSI 260 includes, without limitation, a state cache 262, an error check engine 266, and a pre-calculation (pre-calc) engine 264. The DSI 260 receives commands from the DD 212 and VID 214 stored in memory 210. The DD 212 and VID 214 should be memory resident first-in first-out queues that employ any technically feasible means to convey sequential commands to the DSI 260. For example, the DD 212 and VID 214 may be "push buffers," which are known in the art. The DSI 260 may also receive cursor control data 254 from the cursor commands buffer 268. The DSI 260 may also respond to a register access port 256, which may provide access to state within the DSI 260.

Commands received by the DSI 260 are formatted into state bundles and transmitted over a bundle bus 250 to the memory controller 234. The memory controller 234 receives the state bundles and retransmits the state bundles to bundle bus 252. Each state bundle may include a command, a target register, and a data payload. A state bundle may include, for example, a command to "set" the value of a specific target register with a data payload value. The GPU 230 may include more than one instance of the target register. For example, there may be an instance of a given target register within the memory controller 234 as well as the pipe line 238. When a module, such as the memory controller 234 or pipeline 238, receives a state bundle, the module examines the state bundle to determine if the target register for the state bundle corresponds to any local registers within the module. If a local register is the target register of the state bundle, then the module may respond to the command within the state bundle. The module may then forward the state bundle to any subsequent modules.

The state cache 262 includes storage registers corresponding to the storage registers within modules downstream from the DSI 260 on the bundle bus 250. As the DSI 260 receives date bundles, the state cache 262 caches the data within the state bundles for later retrieval, without the need to access any target registers in down steam modules. An "update" command within a state bundle indicates that the DSI should update the operating state of the memory controller 234, pipe line 238 and RG 240 to a proposed new state indicated by previously received commands. When an update command is received by the DSI 260 in a state bundle, the error check engine 266 performs a series of checks, using configuration parameters cached within the state cache 262, to determine if the proposed new state is allowable and consistent with existing resources and configuration options. For example, if the proposed new state would cause the viewport in 140 to viewport out 150 transformation to be within the capability of the video scaling engine 145, then the proposed new state may be accepted. However, if the proposed new state would cause the viewport in 140 to viewport out 150 transformation to be beyond the capabilities of the video scaling engine 145, then the proposed new state should be rejected.

Upon acceptance by the error check engine 266, the proposed new state may require additional configuration parameters that are specific to the GPU 230, and not necessarily exposed to a GPU driver (not shown). Configuration parameters that are not exposed to the GPU driver are also called "private" configuration parameters. The pre-calc engine 264 computes values for any private configuration parameters needed to perform the update command. The pre-calc engine may use configuration parameters received from the DD 212 and VID 214 as the basis of computing private configuration parameters. Any additional private configuration parameters computed by the pre-calc engine 264 are transmitted to the memory controller 234, pipe line 238, RG 240, and any appropriate down stream modules via the bundle bus 250. After any necessary configuration parameters are transmitted via the bundle bus 250, an update command is transmitted via the bundle bus 250 to cause the respective down stream modules to update their operating parameters, as described in FIG. 3 below.

Figure 3:
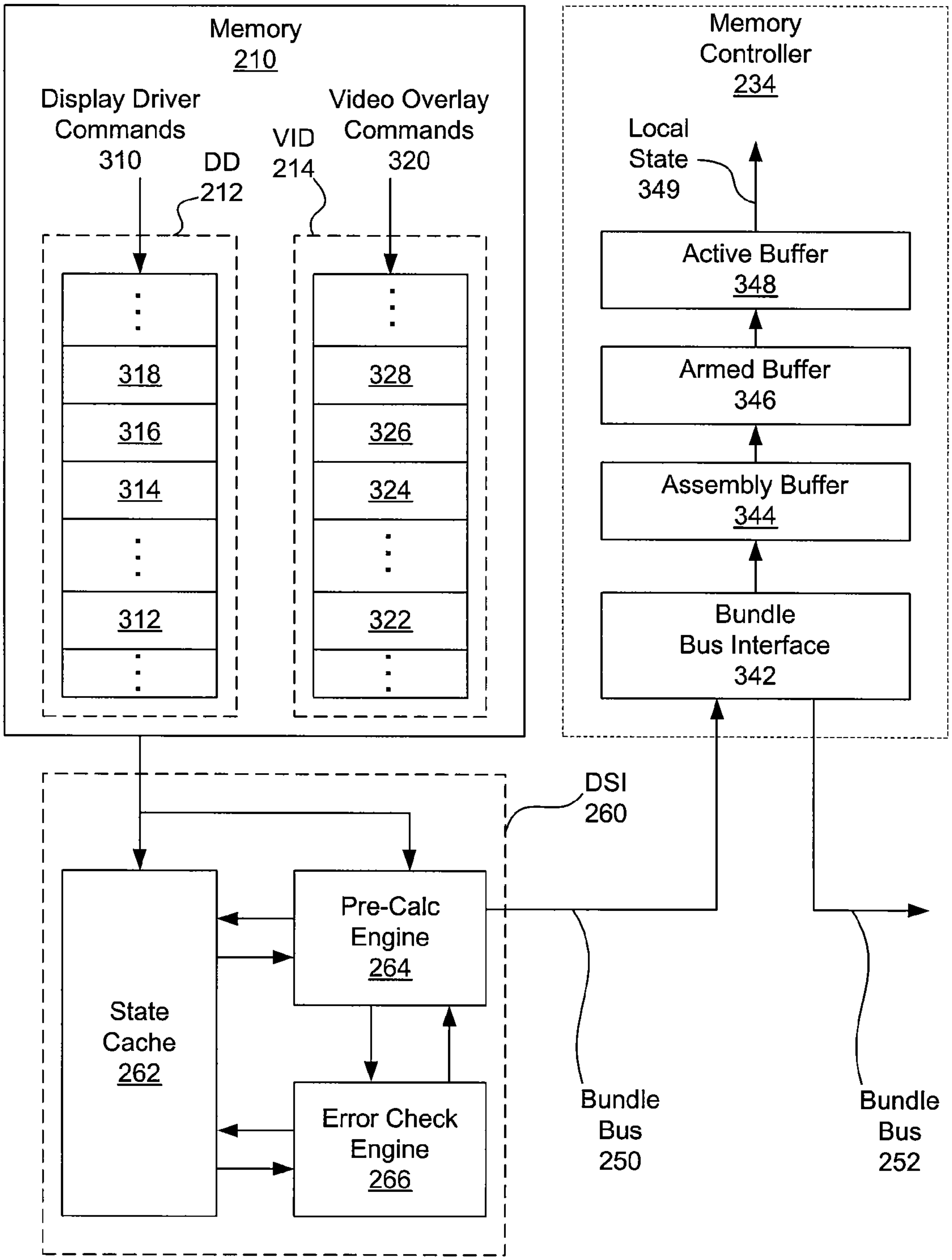
FIG. 3 illustrates a hardware-based engine within a display software interface (DSI) for computing configuration parameters, according to one embodiment of the invention.

FIG. 3 illustrates a hardware-based engine within a display software interface (DSI) 260 for computing configuration parameters, according to one embodiment of the invention. Memory 210 stores display driver commands 310 within DD 212 and video overlay commands 320 within VID 214. As described in FIG. 2, the DSI 260 receives and processes the display driver commands 310 and the video overlay commands 320. The DSI 260 transmits configuration parameters via the bundle bus 250 to the memory controller 234, which retransmits the configuration parameters to any down stream modules, such as the pipe line 238 of FIG. 2, via the bundle bus 253

The display driver commands 310 are queued within the DD 212 as individual commands, including commands 312 to 318. For example, command 312 may include a configuration parameter to adjust the refresh rate of an attached display device, while command 318 may be an update command used to initiate a transition to the new set of configuration parameters, including the new refresh rate command 312. Video overlay commands 320 are queued within the VID 214 as individual commands, including commands 322 to 328. For example, command 322 may include configuration parameters to adjust the position and cropping of a video overlay, such as overlay surface 120 of FIG. 1. Command 328 is an update command used to initiate a transition to the new configuration parameters, including position and cropping of the video overlay.

When an update command is received by the DSI 260, the error check engine 266 performs validity checks on the proposed new state, as retained within the state cache 262. If the proposed new state is valid, then the pre-calc engine 264 may perform additional computation to generate any required private configuration parameters. Configuration parameters are transmitted from the DSI 260 to the memory controller 234 via the bundle bus 250. The bundle bus interface 342 within the memory controller 234 transmits the configuration parameters to an assembly buffer 344. The assembly buffer 344 stores a copy of all possible configuration parameters used within the memory controller 234. The assembly buffer 344 updates the value of a given configuration parameter according to new configuration parameter data received from the bundle bus interface 342. If a given configuration parameter stored within the assembly buffer 344 does not receive an updated value, then the previous value is used for subsequent access. When the bundle bus interface 342 receives an update command from the DSI 260 via the bundle bus 250, the contents of the assembly buffer 344 may be copied to the armed buffer 346. In particular, the bundle bus interface 342 receives a trigger from the DSI 260 and provides the trigger to the armed buffer 346, and, in response, logic within the armed buffer 346 captures the configuration parameters stored in the assembly buffer 344. When the next vertical synchronization mark is generated by the DSI 260, the contents of the armed buffer 346 may be copied to the active buffer 348 during the corresponding vertical blank time. In one embodiment, the DSI 260 generates a vertical synchronization mark in response to the memory controller 234 informing the DSI 260 that all pixels related to a previous display image have been fetched from memory. In response, logic within the active buffer 348 captures the configuration parameters stored in the armed buffer 346.

In one embodiment, the DSI 260 reads the DD 212 command queue until an update command is received for processing before reading commands from the VID 214. Furthermore, the DSI 260 reads the VID 214 command queue until an update command is received for processing before reading commands from the DD 212. In this way, complete, coherent configuration changes may be validated (error checked) and initiated from different drivers that may not be fully aware of each other.

The assembly buffer 344 provides a staging area where configuration parameters may be accumulated, without a hard real time requirement. The armed buffer 346 provides a second staging area, where a complete set of new parameters available. This second staging area provides the first stage where relevant configuration parameters are simultaneously and coherently available. The active buffer 384 is used by real-time refresh logic, such as the RG 240. The active buffer 384 should not be modified, except during specific times, such as during vertical refresh.

The output of the active buffer 348 is a set of local state 349. The local state 349 is used to configure the operation of the respective module containing the local state 349. The pipe line 238 and RG 240 may each contain a corresponding assembly buffer, armed buffer, and active buffer for relevant local state.

Figure 4:
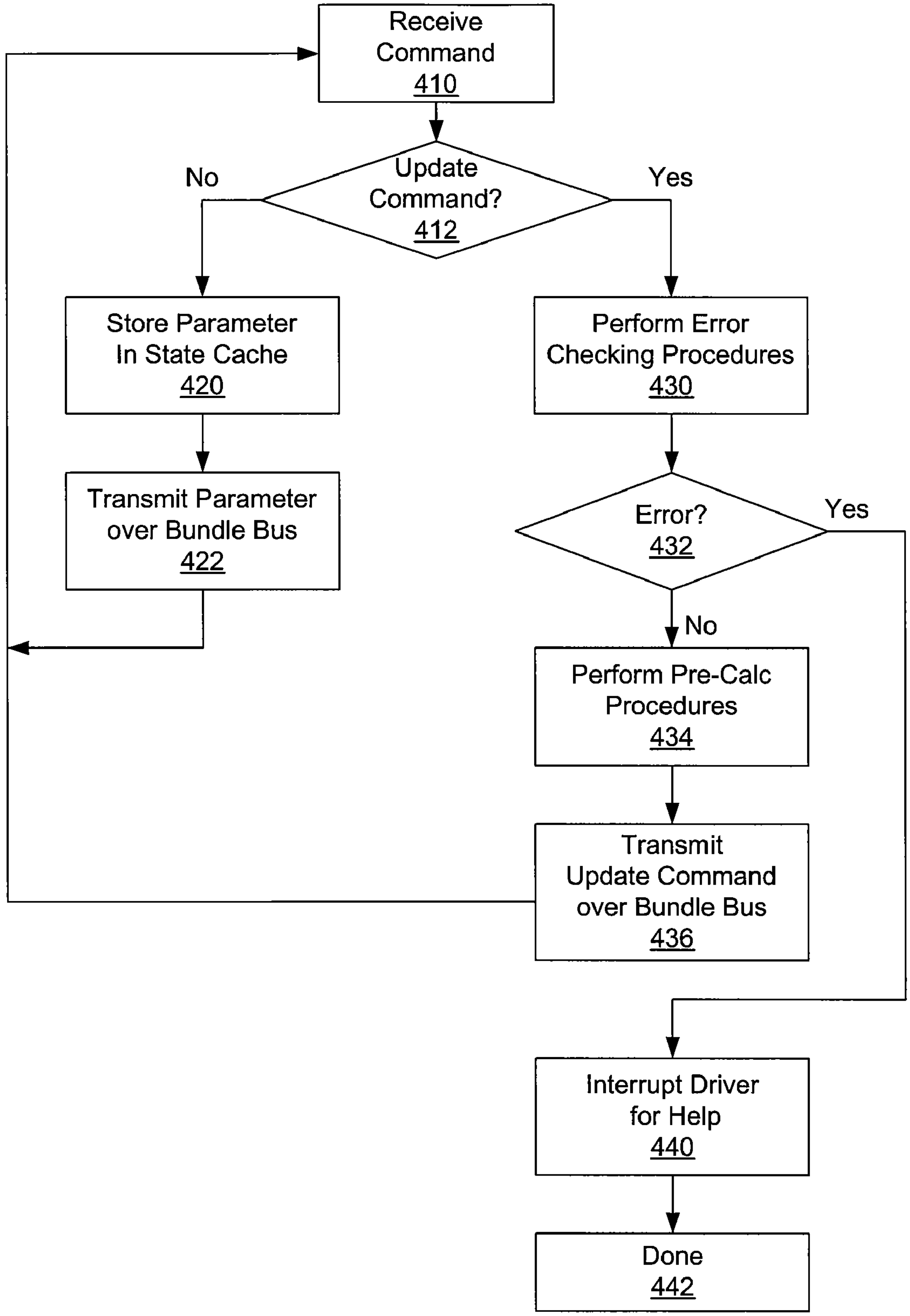
FIG. 4 is a flow diagram of method steps for computing configuration parameters, according to one embodiment of the invention.

FIG. 4 is a flow diagram of method steps for computing configuration parameters, according to one embodiment of the invention. Although the method steps are described in conjunction with the systems of FIGS. 1A, 1B, 2 and 3, persons skilled in the art will understand that any system that performs the method steps, in any order, is within the scope of the invention.

The method of computing configuration parameters begins in step 410, where the DSI 260 receives a command from a command queue. If, in step 412, the command is not an update command, the method proceeds to step 420, where the DSI 260 stores the parameter included in the command in the state cache 262. In step 422, the DSI 260 transmits the parameter over the bundle bus 250.

If, in step 412, the command is an update command, the method proceeds to step 430, where the error check engine 266 performs error checking on the configuration parameters stored in the state cache 262 to determine if the proposed new configuration is valid. If, in step 432, an error is found within the proposed new configuration, the method proceeds to step 440, where an interrupt is generated to a responsible software driver, for example the GPU driver, for help in processing the error. The responsible driver processes the error. For example, the responsible driver may abort the proposed new configuration and restore the previous configuration. The method terminates in step 442.

If, in step 432, no error is found in the proposed new configuration, the method proceeds to step 434, where the pre-calc engine 264 performs procedures to compute any required private configuration parameters and transmit the private configuration parameters to the bundle bus 250. In step 436, the DSI 260 transmits an update command to the bundle bus 250. The method then proceeds back to step 410.

Figure 5:
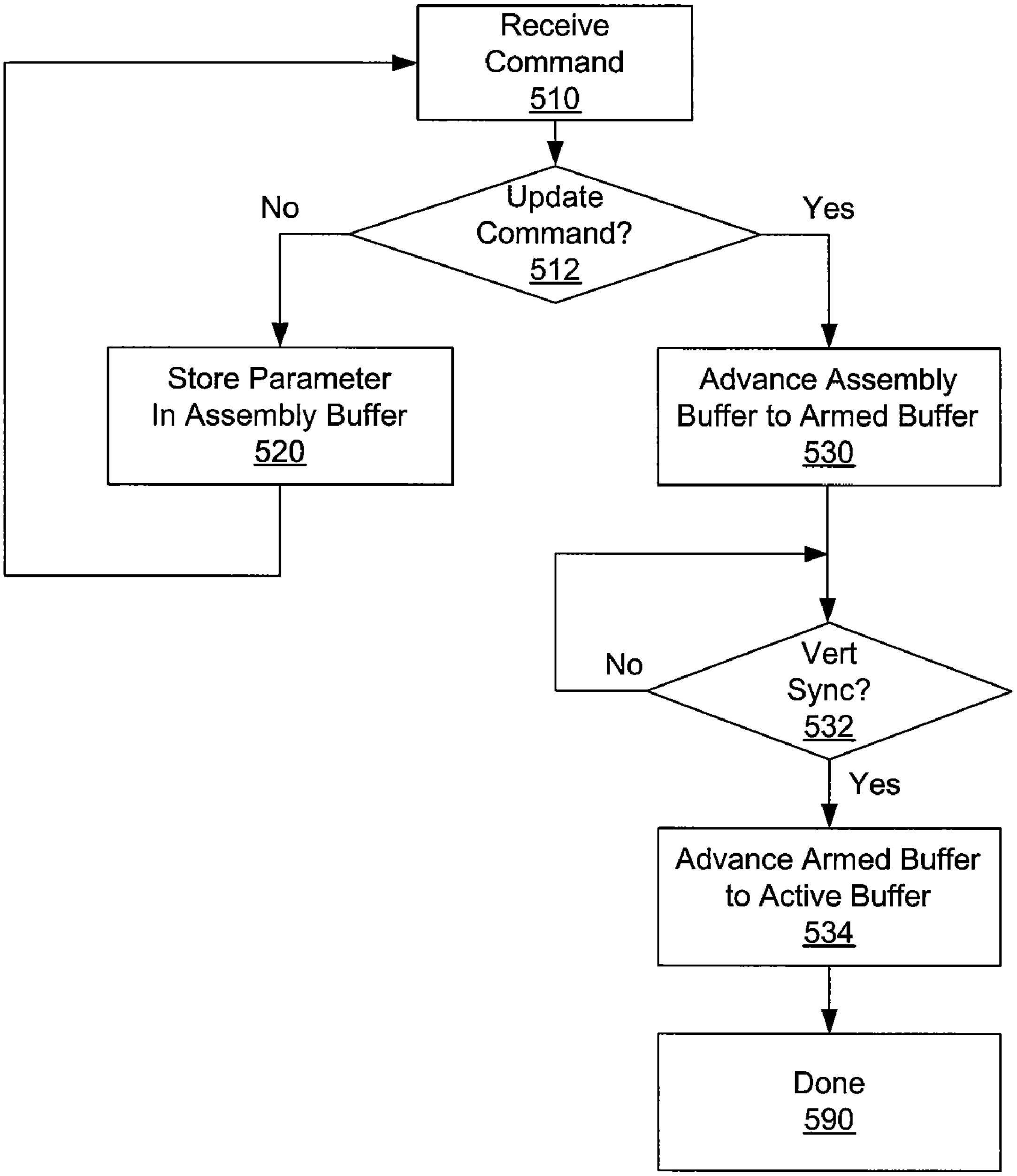
FIG. 5 is a flow diagram of method steps for receiving and processing configuration parameters, according to one embodiment of the invention.

FIG. 5 is a flow diagram of method steps for receiving and processing configuration parameters, according to one embodiment of the invention. Although the method steps are described in conjunction with the systems of FIGS. 1A, 1B, 2 and 3, persons skilled in the art will understand that any system that performs the method steps, in any order, is within the scope of the invention.

The method of receiving and processing configuration parameters begins in step 510, where a bundle bus interface receives a command from a bundle bus. If, in step 512, the command is not an update command, then the method proceeds to step 520, where an assembly buffer stores a parameter associated with the command. The method then proceeds back to step 510.

If, in step 512, the command is an update command, then the method proceeds to step 530, where the contents of the assembly buffer are advanced to an armed buffer. If, in step 532, a vertical synchronization is not being initiated, then the method proceeds back to step 532.

If, in step 532, a vertical synchronization is being initiated, then the method proceeds to step 534, where the contents of the armed buffer are advanced to an active buffer for use in real time processing. The method terminates in step 590.

Figure 6:
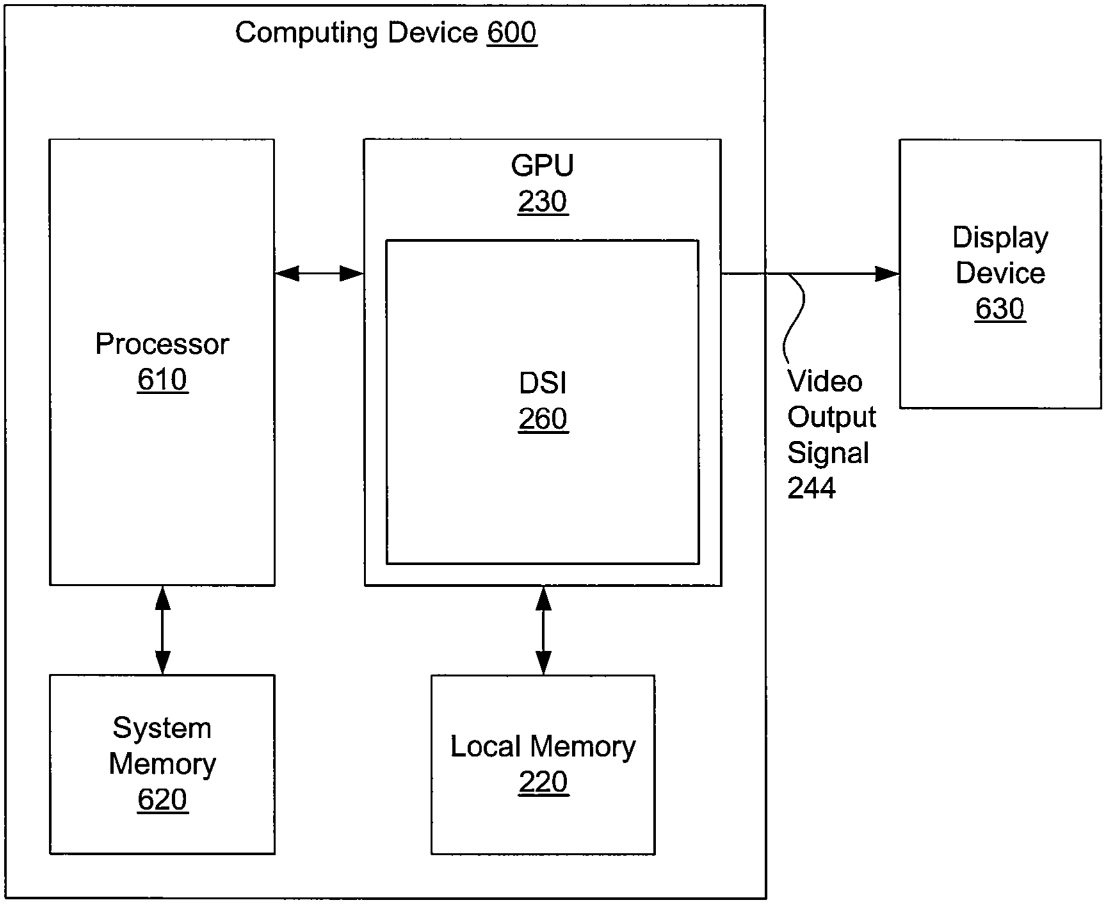
FIG. 6 depicts a computing device in which one or more aspects of the invention may be implemented.

FIG. 6 depicts a computing device 600 in which one or more aspects of the invention may be implemented. The computing device 600 includes, without limitation, a processor 610, system memory 620, a graphics processing unit (GPU) 230, a local memory 220 connected to the GPU 230. The GPU 230 includes a display software interface (DSI) 260. System memory 620 may perform the function of memory 210 of FIG. 2. A display device 630 may be attached to the computing device 600 and used to display raster images generated by the GPU 230 and transmitted via the video output signal 244. Persons skilled in the art will recognize that any system having one or more processing units configured to implement the teachings disclosed herein falls within the scope of the present invention. Thus, the architecture of computing device 600 in no way limits the scope of the present invention.

In sum, a system is presented for high-performance hardware-based error checking and computation of configuration parameters for raster composition within a GPU. Hardware that implements an error checking engine and a pre-calculation engine are added to the display software interface within a GPU. The error checking engine validates a set of one or more new input parameters for compliance with the capabilities and existing configuration of available resources. The pre-calculation engine computes additional private configuration parameters used for raster image generation that are based on a set of new input parameters previously validated by the error checking engine. The new input parameters and private configuration parameters are transmitted to GPU modules that perform functions related to raster image generation.

While the forgoing is directed to embodiments of the present invention, other and further embodiments of the invention may be devised without departing from the basic scope thereof. For example, aspects of the present invention may be implemented in hardware or software or in a combination of hardware and software. Therefore, the scope of the present invention is determined by the claims that follow.

We claim:

1. A method for processing configuration parameters within a graphics processing unit (GPU), the method comprising:

receiving a plurality of commands over a bus that includes at least a first command and one or more previous commands;

determining whether the first command is an update command that includes instructions, for updating an operating state of a memory controller based on the one or more previous commands; and if the first command is not the update command, storing a configuration parameter associated with the first command in a first buffer; or if the first command is the update command, advancing one or more configuration parameters from the first buffer to a second buffer.

2. The method of claim 1, further comprising the step of determining whether a vertical synchronization operation is being initiated.

3. The method of claim 2, further comprising the step of advancing the one or more configuration parameters from the second buffer to a third buffer, if a vertical synchronization operation is being initiated.

4. The method of claim 3, wherein the one or more configuration parameters in the third buffer are used in real-time processing of a viewport surface.

5. The method of claim 1, wherein the step of storing the configuration parameter in the first buffer comprises changing a first value for the configuration parameter to a second value, wherein the second value is received over the bus by a bus interface in conjunction with the first command.

6. The method of claim 1, wherein the plurality of commands received over the bus is transmitted from a display software interface within the GPU.

7. The method of claim 1, wherein the first command is not the updated command, and the configuration parameter associated with the first command and stored in the first buffer represents allowable GPU states.

8. The method of claim 1, wherein the first command is the update command, and the one or more configuration parameters advanced from the first buffer to the second buffer represent allowable GPU states.

9. A system for processing configuration parameters within a graphics processing unit (GPU), the system comprising:

a display software interface in the GPU configured to transmit a plurality of commands over a bus that includes at least a first command and one or more previous commands; and a module configured to process the plurality of commands received over the bus and including a bus interface, a first buffer, and a second buffer, wherein, the bus interface is configured to:

receive the first command over the bus, determine whether the first command is an update command that indicates that the display software interface should update an operating state of a memory controller based on the one or more previous commands, and if the first command is not the update command, transmit a configuration parameter associated with the first command to the first buffer, or if the first command is the update command, cause one or more configuration parameters stored in the first buffer to advance to the second buffer.

10. The system of claim 9, wherein the module further includes a third buffer.

11. The system of claim 10, wherein the bus interface is further configured to determine whether a vertical synchronization operation is being initiated.

12. The system of claim 11, wherein the bus interface is further configured to cause the one or more configuration parameters in the second buffer to advance to the third buffer, if a vertical synchronization operation is being initiated.

13. The system of claim 12, wherein the one or more configuration parameters in the third buffer are used in real-time processing of a viewport surface.

14. The system of claim 9, wherein, when transmitting the configuration parameter associated with the first command to the first buffer, the bus interface is configured to transmit a second value for the configuration parameter received over the bus in conjunction with the first command.

15. The system of claim 9, wherein the module comprises a memory controller or a processing pipeline.

16. A computing device for processing configuration parameters for a viewport surface, the computing device comprises:

a memory that includes a software driver configured to issue a plurality of commands that includes at least a first command and one or more previous commands;

a display software interface configured to receive the plurality of commands from the software driver and to transmit the plurality of commands over a bus; and a module configured to process the plurality, of commands received over the bus and including a bus interface, a first buffer, and a second buffer, wherein, the bus interface is configured to:

receive tag first command over the bus, determine whether the first command is an update command that indicates that the display software interface should update an operating state of a memory controller based on the one or more previous commands, and if the first command is not the update command, transmit a configuration parameter associated with the first command to the first buffer, or if the first command is the update command, cause one or more configuration parameters stored in the first buffer to advance to the second buffer.

17. The computing device of claim 16, wherein the module further includes a third buffer.

18. The computing device of claim 17, wherein the bus interface is further configured to determine whether a vertical synchronization operation is being initiated.

19. The computing device of claim 18, wherein the bus interface is further configured to cause the one or more configuration parameters in the second buffer to advance to the third buffer, if a vertical synchronization operation is being initiated.

20. The computing device of claim 19, wherein the one or more configuration parameters in the third buffer are used in real-time processing of a viewport surface.

21. The computing device of claim 16, wherein, when transmitting the configuration parameter associated with the first command to the first buffer, the bus interface is configured to transmit a second value for the configuration parameter received over the bus in conjunction with the first command.

22. The computing device of claim 16, wherein the module comprises a memory controller or a processing pipeline.

* * * * *

UNITED STATES PATENT AND TRADEMARK OFFICE

CERTIFICATE OF CORRECTION

PATENT NO. : 7,999,815 B1
APPLICATION NO. : 11/936035
DATED : August 16, 2011
INVENTOR(S) : Duncan A. Riach et al.

It is certified that error appears in the above-identified patent and that said Letters Patent is hereby corrected as shown below:

Column 10, Claim 16, line 5 please add --the-- between “receive” and “tag”.

Signed and Sealed this
Twenty-second Day of November, 2011

David J. Kappos
*Director of the United States Patent and Trademark Office*